(12) United States Patent
Ntavos et al.

(10) Patent No.: US 9,630,330 B2
(45) Date of Patent: Apr. 25, 2017

(54) SAFETY RAZOR, CARTRIDGE, AND PROCESS FOR MANUFACTURING THE CARTRIDGE

(75) Inventors: Vasileios Ntavos, Ilion-Athens (GR); Georgios Koulourias, Marousi-Athens (GR)

(73) Assignee: BIC VIOLEX S.A., Anixi (GR)

( * ) Notice: Subject to any disclaimer, the term of this patent is extended or adjusted under 35 U.S.C. 154(b) by 976 days.

(21) Appl. No.: 13/054,758

(22) PCT Filed: Jul. 18, 2008

(86) PCT No.: PCT/EP2008/059467
§ 371 (c)(1),
(2), (4) Date: Jan. 18, 2011

(87) PCT Pub. No.: WO2010/006654
PCT Pub. Date: Jan. 21, 2010

(65) Prior Publication Data
US 2011/0119922 A1   May 26, 2011

(51) Int. Cl.
*B26B 21/22*     (2006.01)
*B26B 21/40*     (2006.01)
(Continued)

(52) U.S. Cl.
CPC ........ *B26B 21/222* (2013.01); *B26B 21/4012* (2013.01); *B26B 21/4068* (2013.01); *B26B 21/4075* (2013.01); *B29C 65/08* (2013.01); *B29C 65/7841* (2013.01); *B29C 66/21* (2013.01); *B29C 66/30223* (2013.01); *B29C 66/54* (2013.01); *B29C 66/73921* (2013.01); *B29C 66/80* (2013.01); *B29C 66/8322* (2013.01); *B29C 66/92921* (2013.01); *B29C 66/71* (2013.01); *B29C 66/919* (2013.01);
(Continued)

(58) Field of Classification Search
CPC .............. B26B 21/222; B26B 21/4012; B26B 21/4018; B26B 21/4025; B26B 21/4037; B26B 21/4068; B26B 21/4075
USPC ........................................... 30/47–51, 77–84
See application file for complete search history.

(56) References Cited

U.S. PATENT DOCUMENTS 3,600,804 A    8/1971   Brown
3,815,233 A *  6/1974   Carroll .............................. 30/47
(Continued)

FOREIGN PATENT DOCUMENTS

BR    P10621787 A2 * 12/2011
EP    0 413 117 A1    6/1960
(Continued)

OTHER PUBLICATIONS

Ultrasonics Plastics Assembly (pp. 33-39 and 57-60), 1979, published by the Branson Ultrasonics Corporation.
(Continued)

*Primary Examiner* — Jason Daniel Prone
(74) *Attorney, Agent, or Firm* — Polsinelli PC

(57) ABSTRACT

A safety razor, cartridge and process for manufacturing the cartridge that includes providing an assembly that includes a platform having a top face, the platform including a cap portion and two lateral side portions. The assembly also includes at least one cutting member extending between the lateral side portions of the platform, and a cover having a bottom face facing the top face of the platform.

13 Claims, 6 Drawing Sheets

(51) Int. Cl.

| | | |
|---|---|---|
| *B29C 65/08* | (2006.01) | |
| *B29C 65/78* | (2006.01) | |
| *B29C 65/00* | (2006.01) | |
| B29K 21/00 | (2006.01) | |
| B29K 25/00 | (2006.01) | |
| B29K 55/02 | (2006.01) | |
| B29K 101/12 | (2006.01) | |
| B29L 31/00 | (2006.01) | |

(52) U.S. Cl.
CPC ........ *B29C 66/9161* (2013.01); *B29C 66/929* (2013.01); *B29C 66/92611* (2013.01); *B29C 66/9513* (2013.01); *B29C 66/9517* (2013.01); *B29C 66/9592* (2013.01); *B29K 2021/00* (2013.01); *B29K 2025/00* (2013.01); *B29K 2055/02* (2013.01); *B29K 2101/12* (2013.01); *B29K 2995/002* (2013.01); *B29L 2031/7186* (2013.01)

(56) References Cited

U.S. PATENT DOCUMENTS

| 3,918,155 | A | | 11/1975 | Atkins | |
|---|---|---|---|---|---|
| 4,690,018 | A | * | 9/1987 | Duncan | 30/50 |
| 4,852,254 | A | * | 8/1989 | Duncan | 30/50 |
| 5,060,377 | A | * | 10/1991 | Althaus et al. | 30/50 |
| 5,070,613 | A | * | 12/1991 | Althaus et al. | 30/50 |
| 5,157,834 | A | * | 10/1992 | Chen et al. | 30/50 |
| 5,182,858 | A | * | 2/1993 | Chen | 30/51 |
| 5,761,814 | A | * | 6/1998 | Anderson et al. | 30/50 |
| 5,956,849 | A | * | 9/1999 | Chadwick et al. | 30/50 |
| 5,989,370 | A | * | 11/1999 | Wannebo | 156/73.1 |
| 6,009,624 | A | * | 1/2000 | Apprille et al. | 30/50 |
| 6,115,902 | A | * | 9/2000 | Garland et al. | 30/50 |
| 6,149,981 | A | * | 11/2000 | Chadwick et al. | 30/50 |
| 6,397,473 | B1 | * | 6/2002 | Clark | 30/50 |
| 6,405,438 | B1 | | 6/2002 | Duez et al. | |
| 6,553,641 | B1 | * | 4/2003 | Garland et al. | 30/50 |
| 6,568,082 | B2 | * | 5/2003 | Pouettre et al. | 30/50 |
| 6,671,961 | B1 | * | 1/2004 | Santhagens Van Eibergen et al. | 30/50 |
| 6,868,082 | B1 | | 3/2005 | Allen, Jr. et al. | |
| 7,100,284 | B2 | * | 9/2006 | King | 30/50 |
| 7,331,107 | B2 | * | 2/2008 | Follo et al. | 30/50 |
| 7,581,318 | B2 | * | 9/2009 | Coffin | 30/50 |
| 8,146,255 | B2 | * | 4/2012 | Denkert et al. | 30/50 |
| 8,151,472 | B2 | * | 4/2012 | Dimitris et al. | 30/527 |
| 8,307,553 | B2 | * | 11/2012 | Follo et al. | 30/50 |
| 8,336,212 | B2 | * | 12/2012 | Bozikis et al. | 30/50 |
| 8,484,852 | B2 | * | 7/2013 | King | 30/532 |
| 2002/0035786 | A1 | * | 3/2002 | Gilder et al. | 30/50 |
| 2003/0159291 | A1 | * | 8/2003 | Clark | 30/50 |
| 2007/0028449 | A1 | * | 2/2007 | King | 30/50 |
| 2007/0137045 | A1 | * | 6/2007 | Follo et al. | 30/50 |
| 2008/0110034 | A1 | * | 5/2008 | Schnak et al. | 30/526 |
| 2008/0115366 | A1 | * | 5/2008 | Follo et al. | 30/50 |
| 2009/0119924 | A1 | * | 5/2009 | Bozikis | 30/50 |
| 2009/0199406 | A1 | * | 8/2009 | Gratsias et al. | 30/45 |
| 2011/0293872 | A1 | * | 12/2011 | Ntavos et al. | 428/43 |
| 2012/0011725 | A1 | * | 1/2012 | Gratsias et al. | 30/50 |

FOREIGN PATENT DOCUMENTS

| EP | 0 413 143 A1 | 7/1970 |
|---|---|---|
| EP | 0 413 117 | 6/1990 |
| GB | 1 251 905 | 11/1971 |
| GB | 1 417 831 | 12/1975 |
| JP | 9262383 | 10/1997 |
| WO | WO 99/20439 | 4/1999 |
| WO | WO 99/41042 | 8/1999 |
| WO | WO 2005/108024 A1 | 11/2005 |
| WO | WO 2006/027018 A1 | 3/2006 |
| WO | WO 2007/147420 A1 | 12/2007 |
| WO | WO 2009/093190 A1 | 7/2009 |
| WO | WO 2010006654 A1 * | 1/2010 |
| WO | WO 2010069388 A1 * | 6/2010 |
| WO | WO 2010069389 A1 * | 6/2010 |

OTHER PUBLICATIONS

Part design for ultrasonic welding, PW-3, Branson Ultrasonics Corporation, 1975, Printed in USA Feb. 2009.

Joint Design for ultrasonic welding, PW-3, Branson Ultrasonics Corporation, May 1978.

Plastic part design for injection molding, 1994, Robert A. Malloy, p. 411.

Joining of plastics, Handbook for Designers and Engineers, 2nd edition, Munich 2004, Jordan Rotheiser, pp. 479 and 480.

Ultrasonic welding and assembly of engineering plastics, Ticona, Celanese AG, Issued in Aug. 1996/7th edition.

Konstruieren mit Kunststoffen, Praxiswissen für Ingenieure Konstruktion, Niederhöfer, Verlag TÜV Rheinland, 1989, pp. 162-177.

* cited by examiner

“SAFETY RAZOR, CARTRIDGE, AND PROCESS FOR MANUFACTURING THE CARTRIDGE”

CROSS REFERENCE TO RELATED APPLICATION

This application is a national stage application of International Application No. PCT/EP2008/059467, filed on Jul. 18, 2008, the entire contents of the application being incorporated herein by reference.

FIELD OF INVENTION

The embodiments of the present invention relate to a process for manufacturing a safety razor cartridge, to safety razor cartridges manufactured by such a process, and to a station for manufacturing a safety razor cartridge.

BACKGROUND OF THE INVENTION

In particular, the instant invention is related to a process for manufacturing a safety razor cartridge with movable blades.

WO 2005/108,024 discloses a process for manufacturing a safety razor cartridge which includes crimping one or a plurality of razor blades to a guard, then laser welding the cap to the guard. Although this process is very efficient and reliable for a cartridge having fixed blades, there is a need to provide an industrially feasible response to the problem of assembling a razor cartridge with movable blades.

SUMMARY OF THE EMBODIMENTS OF THE PRESENT INVENTION

To this aim, it is provided a process for manufacturing a safety razor cartridge comprising providing an assembly comprising a platform having a top face, the platform comprising a cap portion and two lateral side portions, at least one cutting member extending between the lateral side portions of the platform, the cutting member being supported by the platform, the cutting member being movable with respect to the platform, the platform and cutting member cooperating to guide a movement of the cutting member with respect to the platform, a cover having a bottom face facing the top face of the platform, the cover comprising a cap portion covering the cap portion of the platform and two lateral side portions covering the lateral side portions of the platform, welding the cover to the platform by applying an ultrasonic beam to a plurality of discrete locations of the assembly.

With these features, a fast, efficient and reliable process can be industrially implemented.

Further, it is provided a safety razor cartridge comprising a platform having a top face, the platform comprising a cap portion and two lateral side portions, at least one cutting member extending between the lateral side portions of the platform, the cutting member being supported by the platform, the cutting member being movable with respect to the platform, the platform and cutting member cooperating to guide a movement of the cutting member with respect to the platform, a cover having a bottom face facing the top face of the platform, the cover comprising a cap portion covering the cap portion of the platform and two lateral side portions covering the lateral side portions of the platform, a plurality of discrete ultrasonic-welded bonding portions between the cover and the platform.

Further, it is provided a razor comprising such a cartridge.

Further, it is provided an ultrasonic welding station comprising a base station adapted to hold an assembly comprising a platform having a top face, the platform comprising a cap portion and two lateral side portions, at least one cutting member extending between the lateral side portions of the platform, the cutting member being supported by the platform, the cutting member being movable with respect to the platform, the platform and cutting member cooperating to guide a movement of the cutting member with respect to the platform, a cover having a bottom face facing the top face of the platform, the cover comprising a cap portion covering the cap portion of the platform and two lateral side portions covering the lateral side portions of the platform, an ultrasonic beam application device adapted to apply to a plurality of discrete locations of the assembly an ultrasonic beam adapted to weld the cover to the platform.

In some embodiments of the present invention, one might also use one or more of the features defined in the dependent claims.

BRIEF DESCRIPTION OF THE DRAWINGS

Other characteristics and advantages of the embodiments of the present invention will readily appear from the following description of one of its embodiments, provided as a non-limitative example, and of the accompanying drawings.

On the drawings.

DETAILED DESCRIPTION OF THE EMBODIMENTS OF THE PRESENT INVENTION

In the figures, the same references denote identical or similar elements.

Figure 1:
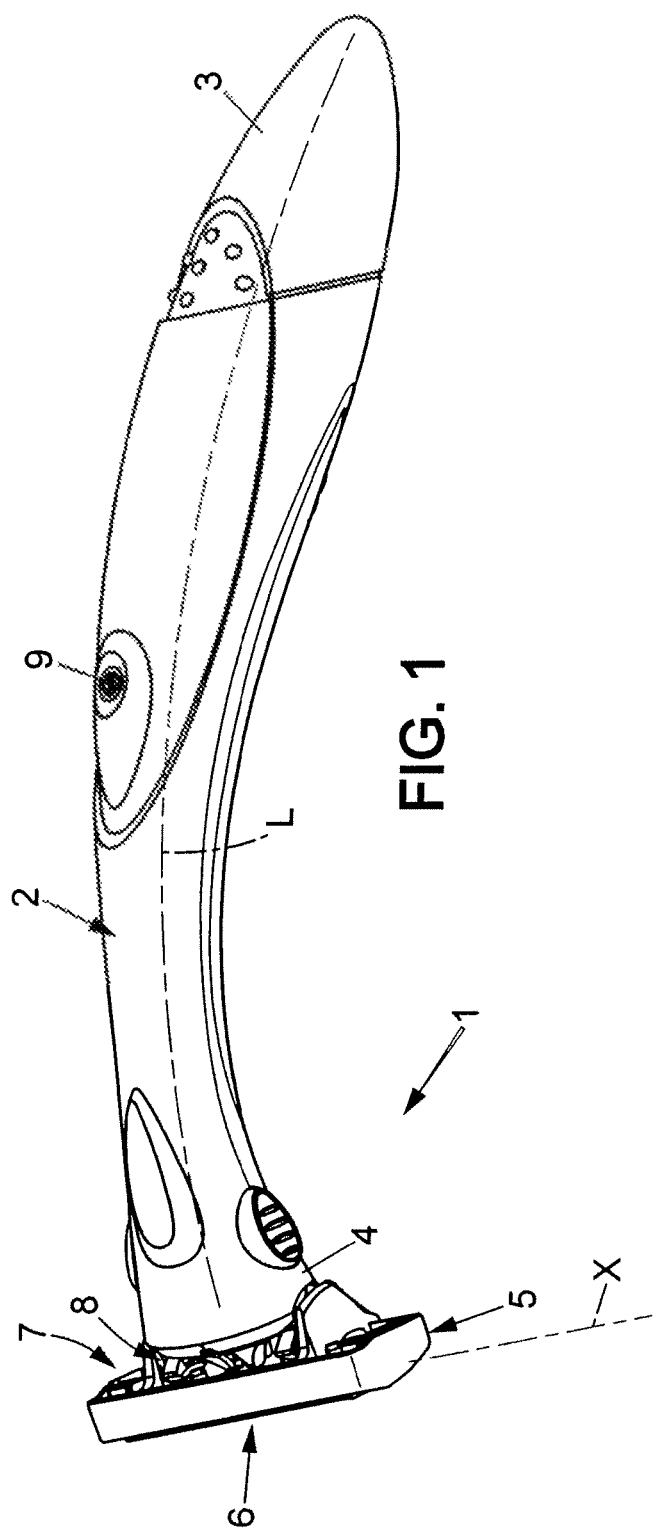
FIG. 1 is a perspective view of a safety razor according to one embodiment of the invention.

FIG. 1 shows a safety razor 1 (also called wet shaver), i.e. a shaver the blades of which are not driven by a motor relative to the blade unit.

The shaver 1 includes a handle 2 extending in a longitudinal direction L between a proximal portion 3 and a distal portion 4 bearing a blade unit 5 or shaving head. The longitudinal direction L may be curved or include one or several straight portions.

The blade unit 5 includes an upper face 6 equipped with one or several cutting members and a lower face 7 which is connected to the distal portion 4 of the handle 2 by a connection mechanism 8. The connection mechanism 8 may for instance enable the blade unit 5 to pivot relative to a pivot axis X which is substantially perpendicular to the longitudinal direction L. The connection mechanism may further enable a user to selectively release the blade unit for the purpose of exchanging blade units. One particular example of connection mechanism usable in the present invention is described in document WO-A-2006/027018, which is hereby incorporated by reference in its entirety for all purposes.

In the particular example shown in FIG. 1, the handle 2 may further include an internal vibrating mechanism (not shown), which may be for instance as described in the above mentioned document WO-A-2006/027018 and which is controlled by a user actuated switch 9.

Of course, the present invention is neither limited to such vibrating handle, nor to any particular connection mechanism connecting the blade unit 5 to the handle 2.

Figure 2:
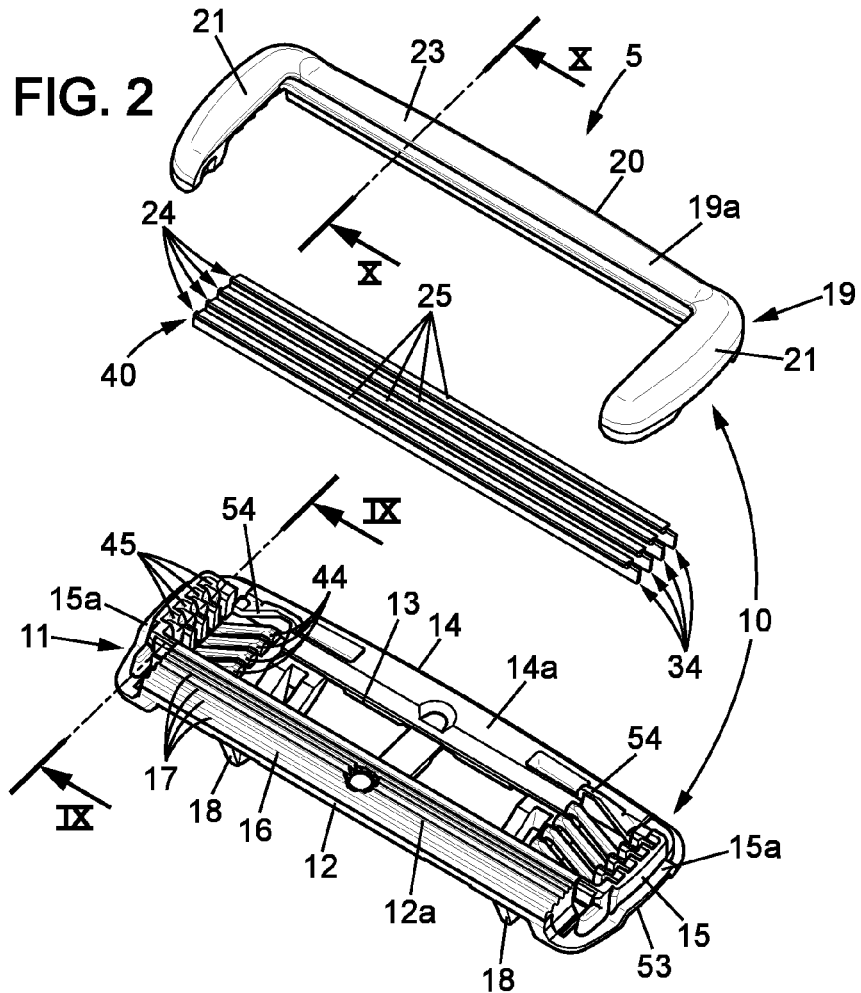
FIG. 2 is an exploded perspective view of the blade unit of the safety razor of FIG. 1.

As shown in FIG. 2, the blade unit 5 includes a frame 10 which is made solely of synthetic materials, i.e. thermoplastic materials (polystyrene or ABS, for example) and elastomeric materials.

More precisely, the frame 10 includes a plastic platform member 11 connected to the handle 2 by the connection mechanism 8 and having a guard 12 extending parallel to the pivot axis X, a blade receiving section 13 situated rearward of the guard 12 in the direction of shaving, a cap portion 14 extending parallel to the pivot axis X and situated rearward of the blade receiving section 13 in the direction of shaving, and two side portions 15 joining the longitudinal ends of the guard 12 and of the cap portion 14 together.

Each of the guard 12, the cap portion 14 and the side portions 15 have a top face (respectively 12a, 14a and 15a) visible on FIG. 2, and an opposite bottom face. These top faces 12a, 14a and 15a together form the so-called top face of the platform.

Each of the side portions 15 has a raised middle portion 53 level with the blade receiving section 13.

Further, the cap portion 14 has two symmetrical triangular lances 54 protruding from the top face 14a of the cap portion.

In the example shown in the figures, the guard 12 is covered by an elastomeric layer 16 forming a plurality of fins 17 extending parallel to the pivot axis X.

Further, in this particular example, the underside of the platform member 11 includes two shell bearings 18 which belong to the connection mechanism 8 and which may be for example as described in the above-mentioned document WO-A-2006/027018.

The frame 10 further includes a plastic cover 19 having a top face 19a (visible on FIG. 2) and an opposite bottom face 19b (see FIG. 3) which faces the top face 12a, 14a, 15a of the components of the platform 11. The cover 19 exhibits a general U shape, with a cap portion 20 partially covering the cap portion 14 of the platform and two side members 21 covering the two side members 15 of the platform. In this embodiment, the cover 19 does not cover the guard 12 of the platform.

The cap portion 20 of the cover 19 may include a lubricating strip 23 which is oriented upward and comes into contact with the skin of the user during shaving. This lubricating strip may be formed for instance by co-injection with the rest of the cover.

Figure 3:
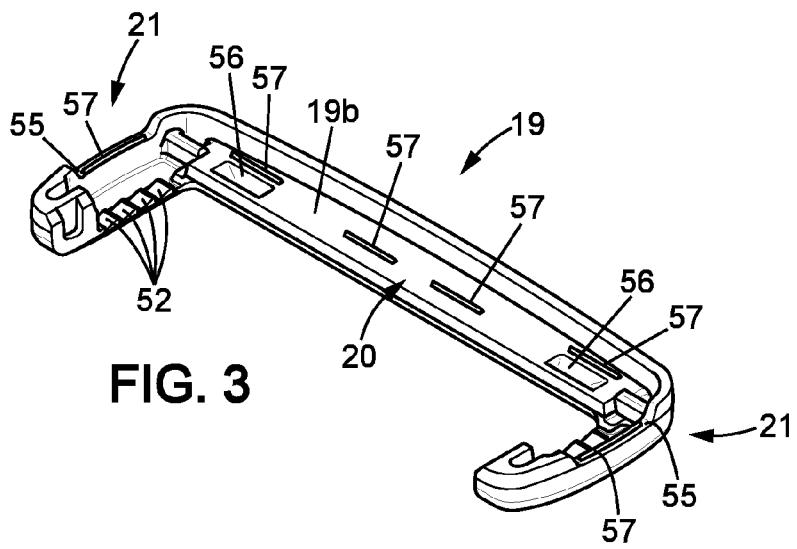
FIG. 3 is a perspective view of a cover seen from the bottom.

As shown on FIG. 3, the vertical edge of the side members 21 of the cover 19 each comprise a recess 55 of shape complementary with the shape of the raised portions 53 of the side members 15 of the platform. Further recesses 56 are formed in the bottom face 19b of the cap portion 20 of shapes which are complementary to the shapes of the lances 54 of the cap portion 14 of the platform.

Bonding portions 57 are provided on the bottom face 19b of the cover 19, to be bonded with corresponding portions 157 of the platform 11. The corresponding portions of the platform are for example flat. In an alternative embodiment, some or all of the bonding portions 57 could be provided on the top face of the platform 11, with the corresponding flat portion provided on the bottom face of the cover.

In the present example, bonding portions 57 are provided symmetrically with respect to the symmetry axis of the cartridge. Two bonding portions 57 are provided each in one of the above-mentioned recesses 55. Two other bonding portions 57 are provided between the recesses 56 and the vertical edge of the cap portion 20 of the cover. Two other bonding portions 57 are provided in the center of the cap portion 20 of the cover. These two later bonding portions 57 are not aligned with the two previously described ones extending close to the recesses 56.

The bonding portions 57 are for example provided as small parts of material, for example of triangular cross-section, and which are molded during the molding process of the cover 19. Their dimension and location might vary to the above-described ones, although the specifically described one was considered to achieve interesting results.

The bonding portions 57 are each provided in a plane which is globally parallel to the plane. In the detailed example, the bonding portions 57 of the cap member 20 are provided in a plane parallel and distinct from the plane containing the bonding portions 57 of the side portions 21. Thus, efficient bonding is achieved.

Figure 4:
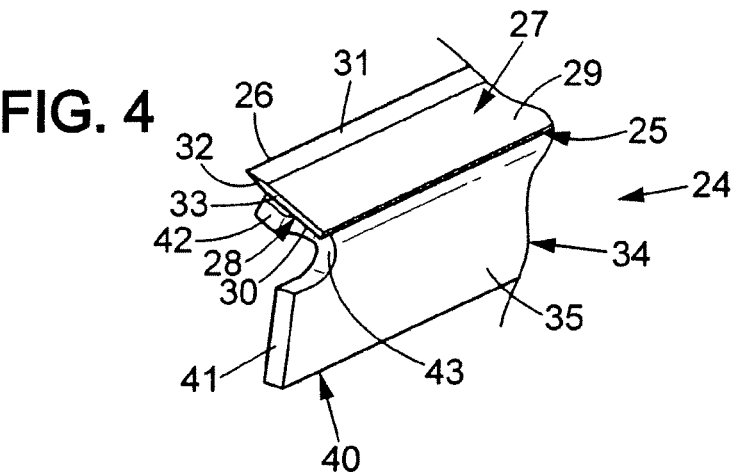
FIG. 4 is a partial perspective view of a cutting member.

As shown on FIG. 4, at least one cutting member 24 is movably mounted in the blade receiving section 13 of the platform. The blade receiving section 13 may include several cutting members 24, for instance four cutting members as in the example shown in the drawings.

Each cutting member 24 includes a blade 25 which is formed by a flat steel strip with a cutting edge 26 oriented forward in the direction of shaving. Each blade 25 has an upper face 27 oriented towards the skin to be shaved and a lower face 28 oriented toward the handle 2. The upper and lower faces 27, 28 of the blade include respectively two parallel main surfaces 29, 30 and two tapered facets 31, 32 which taper towards the cutting edge 26.

Each blade 25 extends longitudinally, parallel to the pivot axis X, between two lateral ends 33.

Each blade 25 is borne by a bent support 34. The bent support 34 is a sheet metal part made out of steel with a bent profile including a substantially flat lower portion 35 (for example substantially perpendicular to the shaving plane), and a substantially flat upper portion 39 which extends parallel to the blade 25.

The blade 25 is fixed on the upper portion 39 of the bent support by any known means, for instance by laser spot welding.

The angle of the upper portion 39 and the blade 25 with respect to the shaving plane may be around 22°.

The lower portion 35 of the bent support 34 extends longitudinally, parallel to the pivot axis X, between two lateral portions 40. Each lateral portion 40 includes a side edge 41.

Besides, the upper portion 39 of the bent support extends longitudinally between two lateral edges each including a rounded protrusion 42 which is constituted by a lateral wing with rounded angles protruding laterally from the upper portion 39 and from a corresponding lateral end 33 of the blade.

Further, a rounded indent 43 is cut out from the sheet metal forming the blade support, the indent separating the rounded protrusion 42 from the lateral edge 41 of the lower portion.

The side edges 41 of the lower portion of the bent support protrude laterally from the lateral ends 33 of the blade and from the rounded protrusions 42.

The bent support may be made from a flat sheet metal part which is then bent before welding of the blade 25 on the upper portion 39 thereof.

As shown in FIG. 2, each cutting member 24 is borne by two elastic fingers 44 which are molded as a single piece with the platform 11 and which extend towards each other and upwardly from both side members 15 of the platform.

Besides, as shown in FIG. 2, the end portions 40 of the bent supports are slidingly guided in vertical slots 45 (i.e. slots which are substantially perpendicular to the shaving plane) provided in the inner face of each side member 15 of the platform.

Figure 9:
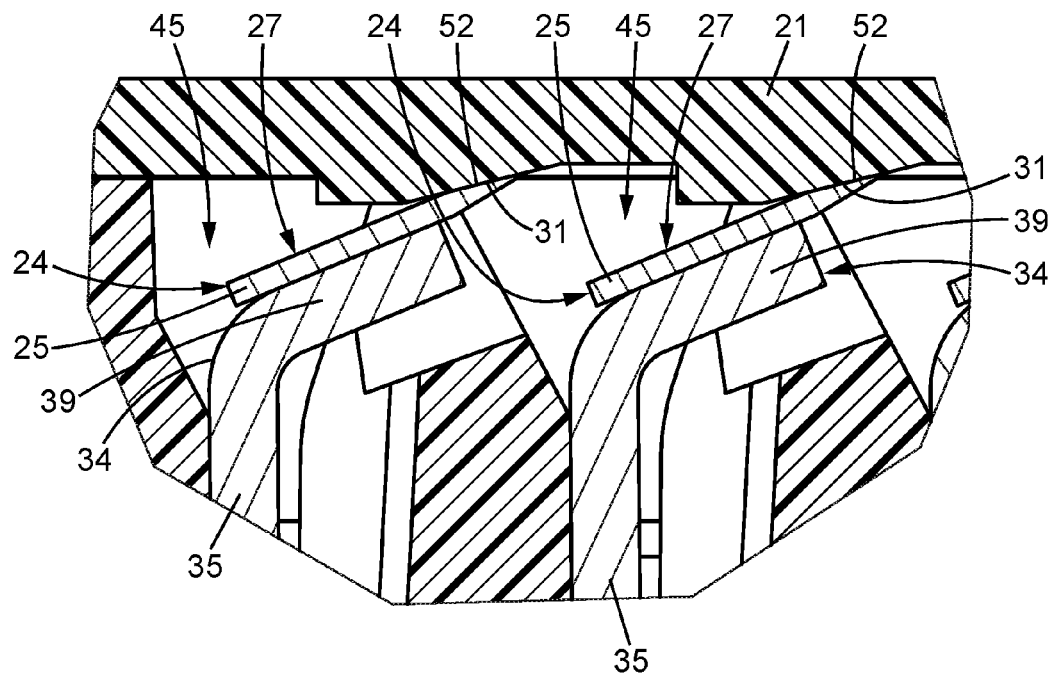
FIG. 9 is a partial cross section of the complete blade unit, taken along line IX-IX of FIG. 2.

The blade members 24 are elastically biased by the elastical arms 44 toward a rest position. In this rest position, the upper faces 27 of the blades, at each lateral end of the blades, bear against corresponding upper stop portions 52 which are provided on the bottom face 19b of each side member 21 of the cover, the side member 21 covering the slots 45 (see FIG. 9).

Therefore, the rest position of the blade members 24 is well defined, therefore enabling a high shaving precision.

Figure 5:
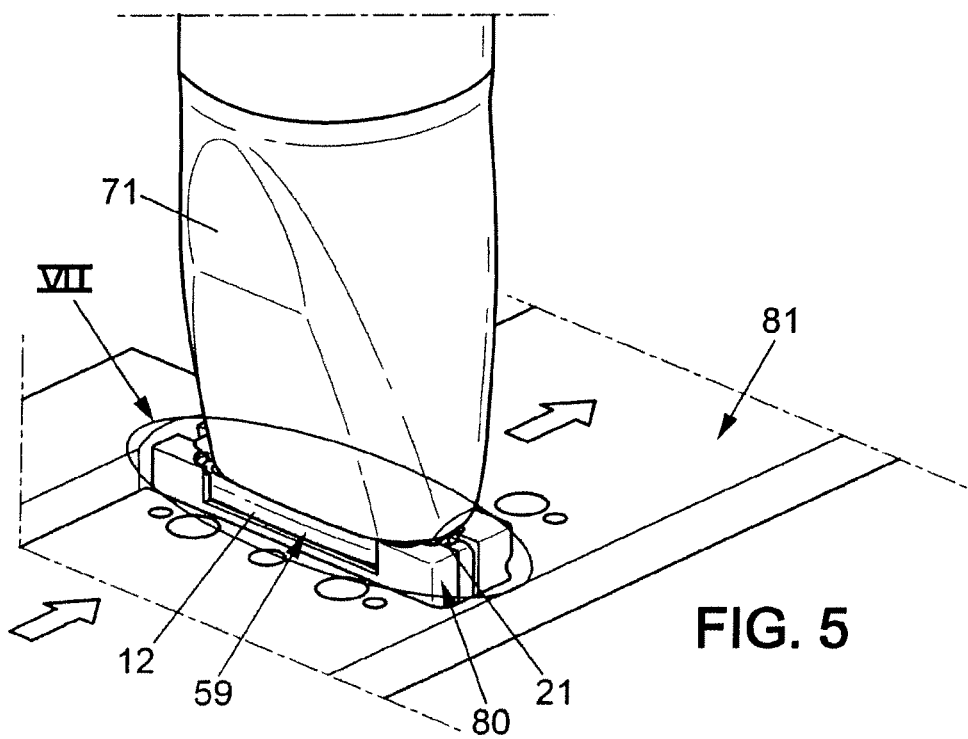
FIG. 5 is a detailed view of the application of the station of FIG. 6 to a cartridge.
Figure 6:
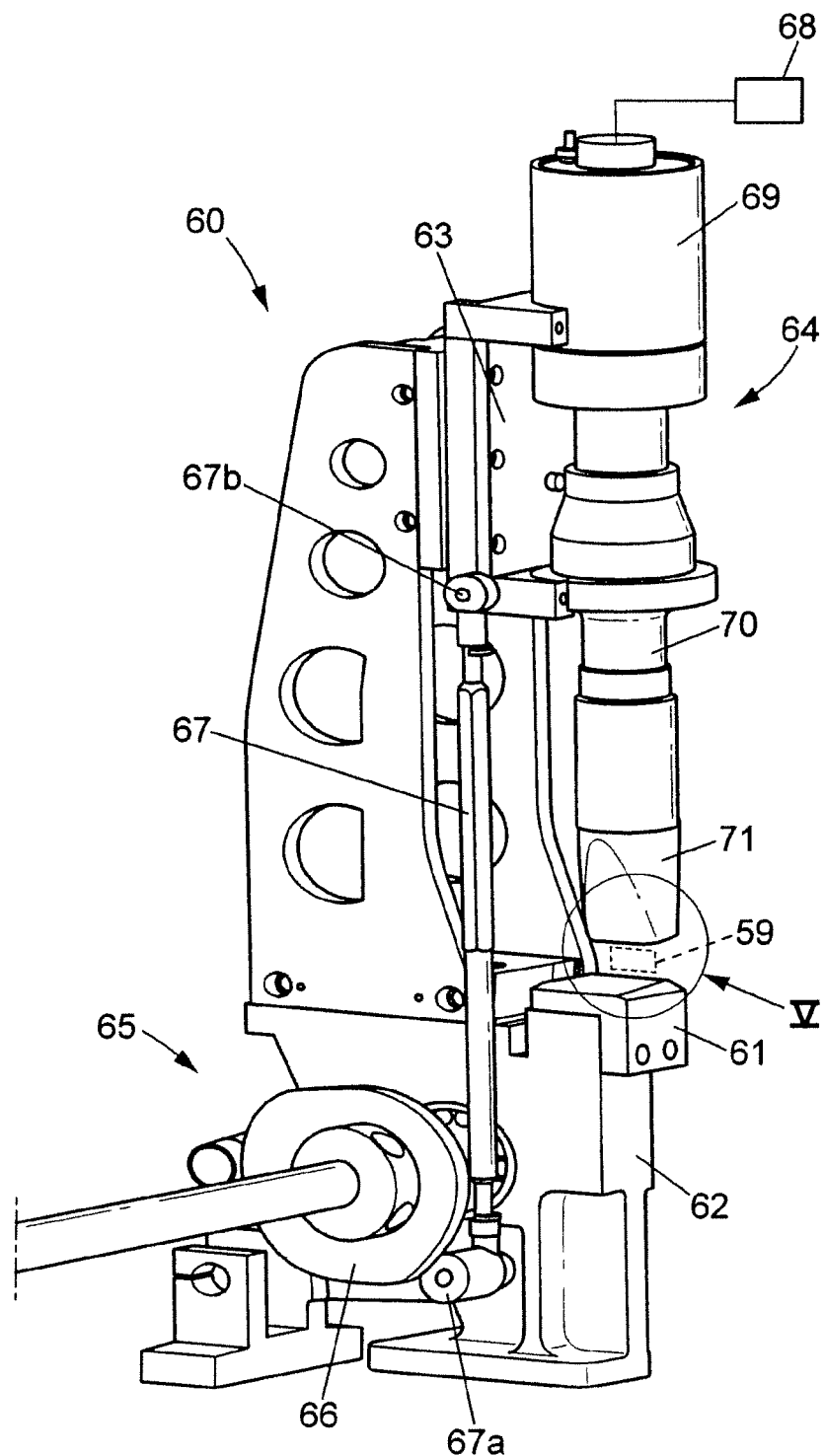
FIG. 6 is a schematic view of an ultrasonic welding station.
Figure 10:
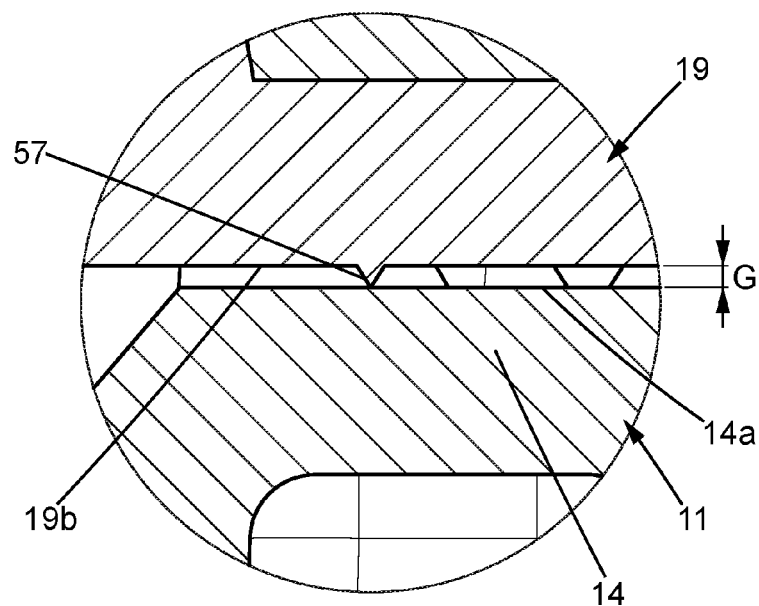
FIG. 10 is a partial cross-section along line X-X of FIG. 2 illustrating the assembled blade unit before applying ultrasonic beam by the welding station.

As shown on FIG. 5, an assembly 59 comprising the platform 11, the cutting members 24 inserted in the slots 45 and supported by the elastic fingers 44, and the unassembled cover 19 is provided into a nest 80 displaced along a conveying path 81 to an ultrasonic welding station 60 shown on FIG. 6. The assembly 59 is displaced there by any suitable way. At this stage, the cover 19 faces upward and is supported on the platform 11 by the lances 54 inserted in the recesses 56 and/or the raised portions 53 inserted in the recesses 55. Also shown in FIG. 10, the bottom face 19b of the cover 19 is distant from the top face 15a, 14a of the platform, forming a gap G, due to the projecting bonding portions 57. Still, the lateral sides 21 of the cover 19 work as stops for the cutting members 24.

The ultrasonic welding station 60 comprises the following elements:

a base 61, which is underneath the nest 80 and supports it during the ultrasonic welding, a fixed bracket 62, which is stationary and holds the base 61, a sliding bracket 63 which slides along the vertical direction, the bracket 63 holding an ultrasonic beam application device 64, to be described later in more details, a driving mechanism 65, which is for example driven by a motor (not shown), is carried by the support 62 and applies a periodic movement to the sliding bracket 63 relative to the fixed bracket 62. For example, the driving mechanism 65 includes a cam 66 having a specific cam profile which pushes one end 67a of a rod 67 which, at its other end 67b, is connected to the sliding bracket 63 so that the sliding bracket performs a reversible motion (hack and forth movement), the ultrasonic beam application device 64, a power source, schematically shown as 68, providing suitable energy to the ultrasonic beam application device 64, for example of 20 kHz and able to deliver 2 kW.

The ultrasonic beam application device 64 itself comprises a converter 69, at which the ultrasonic electrical energy from the power supply 68 is applied. The converter uses for example piezoelectric ceramic elements to transform the high frequency electrical oscillations into mechanical vibrations at the same frequency as the electrical oscillations.

The ultrasonic beam application device 64 further comprises a booster 70 which is used as a mechanical transformer to modify the amplitude of vibrations applied to the assembly 59. The booster has for example a resonant half-wave section of titanium. It is mounted below the converter. It also provides a clamping point of the ultrasonic beam application device 64 to the bracket 63.

The ultrasonic beam application device 64 further comprises a horn 71 tuned as a half-wave section and that applies the necessary force and vibration uniformly to the parts to be assembled. The horn is mounted to the booster. It transfers the ultrasonic vibrations from the converter (modified by the booster 70) to the assembly 59. The shape of the horn determines the amplitude at the face of the horn. The horn is for example designed to provide an amplitude of between 10 and 30 microns at a frequency of 20 kHz.

Figure 7:
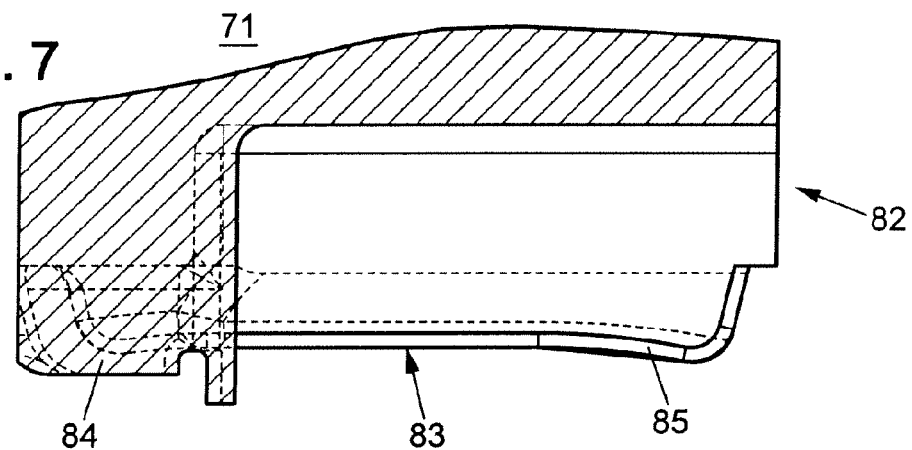
FIG. 7 is a detailed view of FIG. 5, in cross-section along the symmetry axis of the cartridge.

As shown on FIG. 7 (the cross-section of FIG. 7 is taken along the symmetry line of the cover), the tip 82 of the horn 71 has a vibration application device having a profile 83 matching the profile of the cover 19. It has a central portion 84 shaped to come in contact with the cap portion 20 of the cover 19, and lateral portions 85 shaped to come in contact with the lateral side portions 21 of the cover.

Figure 8:
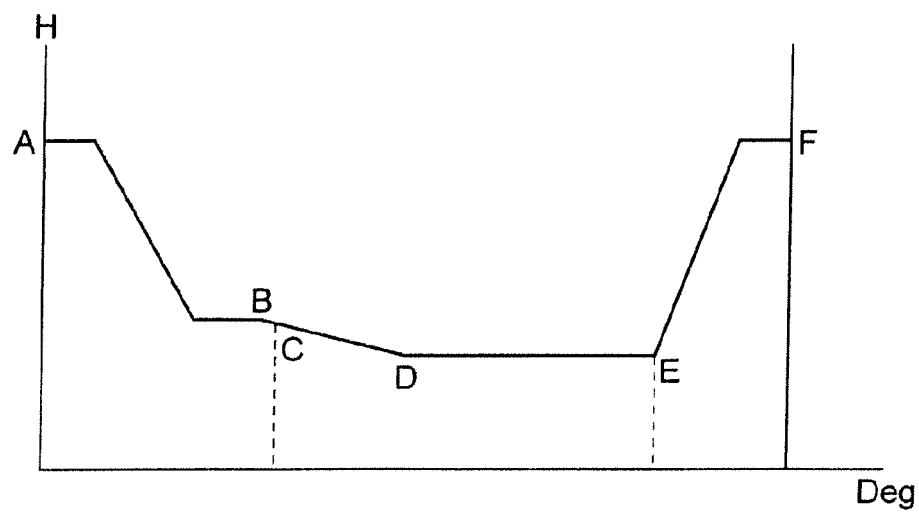
FIG. 8 is a graph of ultrasonic horn stroke (H) versus time.

The ultrasonic welding station 60 periodically operates as follows, in relation to FIG. 8, which plots the stroke (H) of the ultrasonic beam application device 64 with respect to a reference as a function of time (for one cycle):

From point A to point F, the ultrasonic beam application device 64 is held high, then rapidly moved down, then held, then slowly moved down, then held, then quickly moved up and held. From point A to point B, a new assembly 59 is brought to the base station 61. At point B, the ultrasonic beam application device 64 is then held low facing, with no contact, the assembly 59.

From point B to point C, the ultrasonic beam application device 64 is slowly moved down until it contacts the assembly 59.

At point C, ultra-sonic vibrations are started.

From point C to point D, ultra-sonic vibrations are locally focalized on the bonding portions (so-called "energy directors") 57 to generate mechanical vibrations at the interface between the platform and the cover, producing a sharp rise of temperature at the level of the bonding portions 57. Vibrations are applied simultaneously to all the bonding portions 57, which melt. Some of the vibrations can be applied through the lubricating strip 23 of the cover (for the bonding portions 57 which are part of the cap portion of the cover). Bonding occurs only at the bonding portions 57, since there is a small gap G between the upper face of the platform and the lower face of the cover outside the bonding portions. Continued pressure of about 14 kg is applied by the horn 71 to the cover 19, by the continuous lowering of the horn 71 to point D. The booster is set to operate at 1:1.5 and 60%, and the horn is set to apply an amplitude of 22 microns. An energy of 18 J is transferred to the assembly. The cover is lowered simultaneously to the horn, and is guided with respect to the platform by the cooperation of the guiding features 53, 54, 55, 56.

At point D, vibrations are stopped.

From point D to point E, the horn 71 is still in contact with the cover 19, while the molten materials cools down and solidifies, thereby achieving efficient bonding at the bonding portions 57.

From point E to point F, the horn 71 is raised quickly and then held high while the bonded cartridge is removed from the station.

The cycle time of operation (between point A and point F) can be as low as 0.3 seconds, while still providing the expected results.

Although a specific embodiment was disclosed above, it is believed that the parameters of the ultrasonic welding could be chosen in the following range, while still providing an efficient bonding process:

Amplitude: 50 to 90%

Frequency: 20 Energy Khz: 15 to 22 Pressure J: 10 to 16 Kg.

Cycle time: 90 to 200 rotations per minute (rpm).

After assembly, the cap portion 20 of the cover forms, with the cap portion 14 of the platform, a cap 22 with comes into contact with the skin of the user during shaving.

Besides, the side members 21 of the cover form, together with the side members 15 of the platform, two side portions of the frame, joining the guard 12 to the cap 22. During the shaving operation, the cutting members 24 are guidedly movable relative to the platform.

It should be noted that, unlike laser welding, ultrasonic welding could be performed to weld together parts of the same color. Thus, there is no need for a pigment to be added in one of the parts to be welded, thereby leading to a product with good perceived quality.

The invention claimed is:

1. A process for manufacturing a safety razor cartridge, the process comprising:
    providing an assembly comprising:
    a platform comprising a cap portion and two lateral side portions, the cap portion and the side portions of the platform having a top face that define a top face of the platform, elastic fingers extending from both lateral side portions of the platform, and vertical slots provided in an inner face of each lateral side portion of the platform, wherein the vertical slots are adapted to receive and to slidingly guide a cutting member,
    at least one cutting member extending between the lateral side portions of the platform, the at least one cutting member being supported by the elastic fingers, the at least one cutting member being movable with respect to the top face of the platform, the vertical slot guides a movement of the at least one cutting member,
    cover comprising a cap portion covering the cap portion of the platform and two lateral side portions extending from the cap portion and covering the lateral side portions of the platform, the cap portion and lateral side portions of the cover having a bottom face that define a bottom face of the cover, wherein the bottom face of the cover is facing the top face of the platform, wherein the two lateral side portions of the cover partially covers the at least one cutting member,
    wherein the cap portion and both lateral side portions of the platform and the cover each have at least one bonding portion projecting from the top face of the platform and the bottom face of the cover respectively,
    wherein due to the projecting bonding portions the top face of the platform is distant from the bottom face of the cover such that a gap is provided between the top face of the platform and the bottom face of the cover outside of the bonding portions, and
    welding the cover to the platform by applying an ultrasonic beam to the at least one bonding portion of the cap portion and lateral side portions of the cover of the assembly wherein the at least one cutting member is biased by the elastic fingers in abutment with the cover, such that during welding,
    (i) each bonding portion is bonded with a corresponding flat portion of the top face of the platform or the bottom face of the cover, and
    (ii) the bonding occurs only at the bonding portions.

2. The process according to claim 1, wherein, upon welding the ultrasonic beam is applied to the at least one bonding portion of the top face of the platform and bottom face of the cover, through at least one of the platform and the cover.

3. The process according to claim 2, wherein the at least one bonding portion of the cap portion of at least one of the platform and cover is at least three non-aligned bonding portions projecting from the top face of the platform and the bottom face of the cover.

4. The process according to claim 1, wherein the cap portion of the cover has a lubricating strip, and wherein the ultrasonic beam is partly applied through the lubricating strip.

5. The process according to claim 1, wherein an ultrasonic beam application device is periodically moved between a first position enabling introduction and removal of an assembly to a base station, and a second position in contact with the assembly to apply the ultrasonic beam to the assembly, wherein the welding occurs when the ultrasonic b application device is in the second position.

6. The process according to claim 1, wherein the at least one bonding portion of the cap portion and the lateral side portions of the platform and the cover includes at least one bonding portion on the cap portion of the cover provided in a first plane, and a bonding portion on each lateral side portions of the cover provided in a second plane, each bonding portion projecting either from the top face of the platform or from the bottom face of the cover, wherein the second plane is parallel to and distinct from the first plane.

7. The process according to claim 1, wherein the at least one bonding portion of the cap portion of the platform is provided in a first plane, and the at least one bonding portion on each of the lateral side portions of the platform is provided in a second plane, each bonding portion projecting either from the top face of the platform or from the bottom face of the cover, wherein the second plane is parallel to and distinct from the first plane.

8. A safety razor cartridge, wherein the safety razor cartridge comprises:
    a platform comprising a cap portion and two lateral side portions, the cap portion and the side portions of the platform having a top face that define a top face of the platform, as well as elastic fingers extending from both lateral side portions of the platform, and vertical slots provided in an inner face of each lateral side portion of the platform, wherein the vertical slots are adapted to receive and to slidingly guide a cutting member,
    at least one cutting member extending between the lateral side portions of the platform, the cutting member being supported by the elastic fingers, the at least one cutting member being movable with respect to the top face of the platform, the vertical slots guide a movement of the at least one cutting member,
    a cover comprising a cap portion covering the cap portion of the platform and two lateral side portions extending from the cap portion and covering the lateral side portions of the platform the cap portion and lateral side portions of the cover having bottom face that define a bottom face of the cover, wherein the bottom face is facing the top face of the platform, wherein the two lateral side portions of the cover partially cover the at least one cutting member being biased by the elastic fingers in abutment with the cover, wherein the cap portion and both lateral side portions of the platform and cover each have at least one bonding portion projecting from the top face of the platform and the bottom face of the cover respectively, wherein each bonding portion is bonded with a corresponding flat portion of the top face of the platform or the bottom face of the cover, wherein due to the projecting bonding portions the top face of the platform is distant from the bottom face of the cover such that a gap is provided between the top face of the platform and the bottom face of the cover outside of the bonding portions, wherein the bonding occurs only at the bonding portions, and wherein the at least one bonding portion projecting from the cap portion and both lateral side portions of the platform and cover is ultrasonic-welded to the corresponding flat portion of the bottom face of the cover or the top face of the platform.

9. The cartridge according to claim 8, wherein the at least one cutting members comprise a razor blade fixed on a L-shape metallic support.

10. The cartridge according to claim 8, wherein the cap portion of the cover and the platforom have mechanical guiding features of complementary shapes, adapted to guide a relative displacement of the cover and platform toward one another during assembly of the cover and the platform.

11. The safety razor cartridge accordingy to claim 8, wherein the cap portion of the cover is provided with at least one bonding portions in a first plane, wherein the side portions of the cover are provided with at least one bonding portion in the second plane, wherein the second plane is parallel to and distinct from the first plane.

12. The safety razor cartridge according to claim 8, wherein the cap portion of the platform is provided with at least one bonding portion in a first plane, wherein the side portions of the platform are provided with at least one bonding portion in a second plane, wherein the second plane is parallel to and distinct from the first plane.

13. A safety razor comprising a cartridge according to claim 8.

* * * * *